(12) United States Patent
Ghai

(10) Patent No.: US 8,331,384 B2
(45) Date of Patent: Dec. 11, 2012

(54) SYSTEM AND METHOD FOR FEMTO COVERAGE IN A WIRELESS NETWORK

(75) Inventor: Rajat Ghai, Sandwich, MA (US)

(73) Assignee: Cisco Technology, Inc., San Jose, CA (US)

( * ) Notice: Subject to any disclaimer, the term of this patent is extended or adjusted under 35 U.S.C. 154(b) by 393 days.

(21) Appl. No.: 12/778,749

(22) Filed: May 12, 2010

(65) Prior Publication Data

US 2010/0291897 A1    Nov. 18, 2010

Related U.S. Application Data

(60) Provisional application No. 61/177,491, filed on May 12, 2009.

(51) Int. Cl.
*H04L 12/28* (2006.01)
(52) U.S. Cl. ........ 370/401; 370/328; 370/338; 370/353; 370/354; 370/331; 455/410; 455/436; 455/444
(58) Field of Classification Search ............... 370/331, 370/338, 401, 352–356; 455/410–411, 436–437
See application file for complete search history.

(56) References Cited

U.S. PATENT DOCUMENTS

| | | | |
|---|---|---|---|
| 7,577,443 B1 * | 8/2009 | Moll et al. ............... | 455/456.1 |
| 8,064,909 B2 * | 11/2011 | Spinelli et al. ............. | 455/436 |
| 8,179,903 B2 * | 5/2012 | Gupta et al. ............... | 370/400 |
| 2007/0097983 A1 * | 5/2007 | Nylander et al. ........... | 370/395.2 |
| 2008/0096553 A1 | 4/2008 | Saksena et al. | |
| 2008/0176582 A1 | 7/2008 | Ghai et al. | |
| 2008/0318551 A1 | 12/2008 | Palamara et al. | |
| 2009/0061821 A1 * | 3/2009 | Chen et al. .................. | 455/411 |
| 2009/0061873 A1 * | 3/2009 | Bao et al. .................... | 455/436 |
| 2009/0067417 A1 * | 3/2009 | Kalavade et al. ............ | 370/356 |
| 2009/0070469 A1 | 3/2009 | Roach et al. | |
| 2009/0086742 A1 * | 4/2009 | Ghai et al. .................. | 370/401 |
| 2009/0094683 A1 | 4/2009 | Morgan et al. | |
| 2009/0111427 A1 | 4/2009 | Mack et al. | |
| 2009/0129263 A1 | 5/2009 | Osborn | |
| 2009/0129336 A1 | 5/2009 | Osborn | |
| 2009/0129348 A1 | 5/2009 | Osborn | |
| 2009/0129349 A1 | 5/2009 | Osborn | |
| 2009/0131016 A1 | 5/2009 | Osborn | |
| 2009/0131017 A1 | 5/2009 | Osborn | |
| 2009/0131018 A1 | 5/2009 | Osborn | |
| 2009/0131024 A1 | 5/2009 | Osborn | |
| 2009/0131029 A1 | 5/2009 | Osborn | |
| 2009/0131049 A1 | 5/2009 | Osborn | |
| 2009/0131050 A1 | 5/2009 | Osborn | |
| 2009/0131062 A1 | 5/2009 | Osborn | |
| 2009/0131086 A1 | 5/2009 | Osborn | |

(Continued)

*Primary Examiner* — Sharad Rampuria
(74) *Attorney, Agent, or Firm* — Wilmer Cutler Pickering Hale and Dorr LLP

(57) ABSTRACT

Systems and methods are disclosed that provide femto-based wireless coverage in a communication network. This can involve providing an interworking function that communications with a femto base station or femto cell to provide connectivity to the core network. The interworking function can provide service and mobility management where a femto cell (such as a home node B (HNB)) is served concurrently by an IMS core and a legacy core. The interworking function can also provide service through a femto cell to a variety of mobile nodes such as legacy devices and IMS capable devices. The interworking function also provides the ability for handoffs to occur between the core networks and between a femto cell and a macro cell.

17 Claims, 16 Drawing Sheets

U.S. PATENT DOCUMENTS

| | | |
|---|---|---|
| 2009/0141625 A1 | 6/2009 | Ghai et al. |
| 2009/0156213 A1 | 6/2009 | Spinelli et al. |
| 2009/0207757 A1 | 8/2009 | Andreasen et al. |
| 2009/0207823 A1* | 8/2009 | Andreasen et al. ........... 370/338 |
| 2009/0257429 A1 | 10/2009 | Osborn |
| 2009/0258644 A1 | 10/2009 | Osborn |
| 2009/0285225 A1 | 11/2009 | Dahod |
| 2009/0311987 A1 | 12/2009 | Edge et al. |
| 2010/0029278 A1 | 2/2010 | Fang et al. |
| 2010/0034179 A1 | 2/2010 | Semper |
| 2010/0039993 A1 | 2/2010 | Ramankutty et al. |
| 2010/0041375 A1 | 2/2010 | Osborn |
| 2010/0041376 A1 | 2/2010 | Osborn |
| 2010/0041398 A1 | 2/2010 | Sand et al. |
| 2010/0041424 A1 | 2/2010 | Osborn |
| 2010/0048174 A1 | 2/2010 | Osborn |
| 2010/0048175 A1 | 2/2010 | Osborn |
| 2010/0048176 A1 | 2/2010 | Osborn |
| 2010/0048216 A1 | 2/2010 | Sundarraman et al. |
| 2010/0069101 A1 | 3/2010 | Mahdi et al. |
| 2010/0074223 A1* | 3/2010 | Mahdi ........................... 370/331 |
| 2010/0074224 A1 | 3/2010 | Mahdi et al. |
| 2010/0077459 A1 | 3/2010 | Mahdi et al. |
| 2010/0085978 A1 | 4/2010 | Ramankutty et al. |
| 2010/0091653 A1 | 4/2010 | Koodli et al. |
| 2010/0215018 A1* | 8/2010 | Ejzak ............................ 370/331 |
| 2011/0103310 A1* | 5/2011 | Stojanovski et al. .......... 370/328 |
| 2011/0171953 A1* | 7/2011 | Faccin et al. ................ 455/426.1 |

* cited by examiner

SYSTEM AND METHOD FOR FEMTO COVERAGE IN A WIRELESS NETWORK

CROSS-REFERENCE TO RELATED APPLICATIONS

This application claims benefit under 35 U.S.C. §119(e) of U.S. Provisional Patent Application No. 61/177,491, entitled "System and Method for a Femto-Coverage in a Wireless Network," filed May 12, 2009, which is hereby incorporated by reference herein in its entirety.

FIELD OF THE DISCLOSURE

This disclosure relates to the field of telecommunications, and more particularly, a system and method for providing femto-based wireless coverage in a communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and Hiper-MAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology. The range of the wireless communication technology can also vary depending on the deployment. A macro cell transceiver is typically used by service providers to provide coverage over a five kilometer distance. A pico cell transceiver can provide coverage over about a half kilometer distance, and a femto cell transceiver can provide coverage over a 50-200 meter distance. A femto cell transceiver is similar in coverage to a WiFi access point and can be used to provide network access over a short range.

Current wireless communication systems use either, or a combination of, circuit switching and packet switching in order to provide mobile data services to user equipment such as a mobile node. User equipment can be a cell phone, a PDA, a Blackberry, a laptop computer with a wireless card, or any other wireless device. Generally speaking, with circuit-based approaches, wireless data is carried by a dedicated (and uninterrupted) connection between the sender and recipient of data using a physical switching path. Once the direct connection is set up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn down and the network resources are allocated to other users as necessary.

Packet-based approaches, on the other hand, do not permanently assign transmission resources to a given call, and do not require the setup and teardown of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The packet flow may include a number of packets or a single packet.

A part of the evolution of packet based communications has been the development of IP Multimedia Subsystem (IMS). IMS is an architectural framework for delivering internet protocol (IP) multimedia to mobile nodes. A call session control function (CSCF) can manage much of the signaling that occurs in an IMS core. The CSCF functionality can be logically divided into three functionalities: a Proxy-CSCF (P-CSCF), an Interrogating CSCF (I-CSCF), and a Serving CSCF (S-CSCF). Additionally, the CSCF functionality is envisioned by two different groups for inclusion in two different topologies: Global System for Mobile Communications (GSM) and CDMA 2000. The $3^{rd}$ Generation Partnership Project (3GPP) is responsible for IMS which works with GSM systems and the $3^{rd}$ Generation Partnership Project 2 (3GPP2) is responsible for Multimedia Domain (MMD) which is used with CDMA systems and is based on the 3GPP IMS concept. The current IMS standards place significant responsibility on application servers to manage the mobile nodes requesting content and services and to communicate within certain parameters. With the fast pace of development, there are a number mobile nodes with varying capabilities as well as a number of application servers with varying capabilities, and all application servers may not be fully IMS compliant.

IMS packet based communications rely on session initiation protocol (SIP) to initiate and control telephone calls. This protocol is widely used on Voice-over-IP (VoIP) networks to control and manage telephony features on a standard IP network, and has been adapted for use with IMS. Among the many uses of SIP are creation, modification and termination of unicast or multicast sessions involving one or several media streams. SIP is designed to be independent of its underlying transport layer, but typically runs on TCP/IP networks. Its headers are similar to Hypertext Transport Protocol (HTTP) headers in that they are embodied in plain text; this allows a network operator to examine SIP packets and route them efficiently and simply.

SUMMARY OF THE DISCLOSURE

Systems and methods are disclosed that provide femto-based wireless coverage in a communication network. This can involve providing an interworking function that communications with a femto base station or femto cell to provide connectivity to the core network. The interworking function can provide service and mobility management where a femto cell (such as a home node B (HNB)) is served concurrently by an IMS core and a legacy core. The interworking function can also provide service through a femto cell to a variety of mobile nodes such as legacy devices and IMS capable devices. The interworking function also provides the ability for handoffs to occur between the core networks and between a femto cell and a macro cell.

One embodiment is directed to a femto gateway which includes an interface configured to establish a security association using encryption to provide a secure tunnel through a broadband network to at least one femtocell, a second interface configured to establish circuit switched communications with a circuit switched network, and a third interface configured to establish communications with an IP Multimedia Subsystem (IMS) network. The femto gateway also includes an interworking function that communicates with user equipment through the security association to provide connectivity to both IMS and circuit switched networks and interworks NAS signaling received from the user equipment over the security association into session initiation protocol (SIP) signaling to enable communication with the IMS network using SIP signaling, and a service domain selection function that is configured to determine if the interworking function provides connectivity to the IMS network or the circuit switched network.

Another embodiment is directed to a method that includes steps of establishing a security association using encryption to provide a secure tunnel through a broadband network to at least one femtocell, establishing circuit switched communications with a circuit switched network, establishing communications with an IP Multimedia Subsystem (IMS) network, communicating with user equipment through the security association to provide connectivity to both IMS and circuit switched networks, interworking NAS signaling received from the user equipment over the security association into session initiation protocol (SIP) signaling to enable communication with the IMS network using SIP signaling, receiving NAS signaling from a circuit switched user equipment and providing connectivity to a circuit switched network through an interworking function, and determining at a service domain selection function if the interworking function provides connectivity to the IMS network or the circuit switched network.

Yet another embodiment is directed to a femto gateway, the gateway including means for establishing a security association using encryption to provide a secure tunnel through a broadband network to at least one femtocell, means for interworking NAS signaling received from the user equipment over the security association into session initiation protocol (SIP) signaling to enable communication with the IMS network using SIP signaling, means for receiving NAS signaling from a circuit switched user equipment and providing connectivity to a circuit switched network through an interworking function, and means for determining at a service domain selection function if the interworking function provides connectivity to the IMS network or the circuit switched network.

DETAILED DESCRIPTION

Femto Wireless Networking

Figure 1:
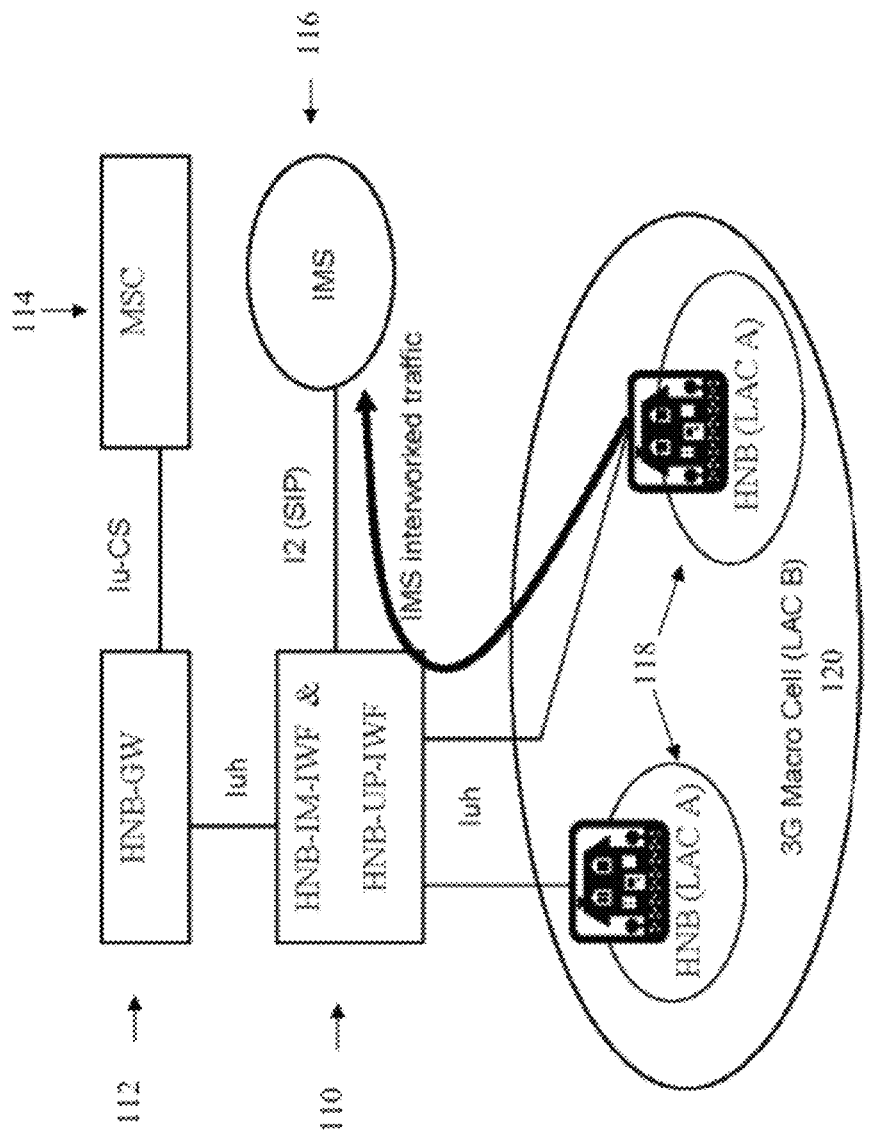
FIG. 1 is a schematic diagram of various nodes in a femto IMS network.

Systems and methods are disclosed that provide femto-based wireless coverage in a communication network. A gateway or interworking function can be used to communicate with a femto base station or femto cell to provide service to an area that either does not receive coverage from a service provider or the coverage is lacking For example, a service provider, such as Verizon Wireless, can sell or give a customer a femto cell for placement in the customer's home to provide service to a mobile node in, for example, a 50 meter area. The femto cell then can communicate over a broadband connection to the interworking function, which can integrate the call into the service provider's network. The benefits to a customer include reduced cost calls and the attractions of fixed-mobile-convergence (FMC), such as the convenience of using a single device. The benefits to a service provider include the opportunity to increase average revenue per user and increase network capacity while reducing expenses by moving communication flows from expensive outdoor macrocells to cheaper domestic systems, dropping the need for new macrocell equipment and reducing the demand for backhaul and power. In some embodiments, the gateway and interworking function, in combination or separately, can be implemented on a Starent Networks, Corp. chassis platform. In other embodiments, the gateway and interworking function, in combination or separately, can be implemented on a Cisco Systems, Inc. 3G femtocell, Cisco Femtocell Gateway, Cisco ASR 5000, Cisco 7600 series router, Cisco wireless security gateway, Cisco broadband access center, or other Cisco router or gateway.

Femto based telephony systems provide for mobile phone service over a short distance, for example, 25 to 200 meters. A femto cell provides an air interface for mobile nodes and transmission of this information over a broadband connection. A femto gateway or home nodeB interworking function (HNB-IWF), which can be implemented in a chassis platform, communicate with one or more femto cells and provide access to the service provider's network. The interworking function (HNB-IWF) can allow the femto cell to be a simple device to lower the cost of manufacturing the unit. In some embodiments, the interworking function acts on behalf of the femto cell to reduce the number of capabilities the femto cell might otherwise need to perform. For example, the interworking function can create a logical endpoint to exchange signal messaging with another radio network controller (RNC) device in the network to allow for a handoff, for example. In some embodiments the interworking function may be implemented on the HNB; in other embodiments it may be implemented on the femto gateway or on other hardware devices in the network stack.

The interworking function can also provide a connection to the femto cell that allows the femto cell to provide different air interfaces, for example, UMTS, GSM, and CDMA2000, while communications between the interworking function and the femto cell are in a common protocol. This feature allows the development of femto cells that can switch air interfaces as a subscriber switches from a service provider that supports UMTS to a service provider that supports CDMA2000. A multiple access technology femto cell can also provide service to more than one device. For example, in a family if the father has a business phone that was with one service provider and a personal phone that was with another service provider. The femto cell could inter-operate with more than one carrier, in some embodiments.

The interworking function supports existing 2nd generation (2G) and 3rd generation (3G) mobile nodes such as GSM, W-CDMA, UMTS, CDMA 2000, and WiMAX as well as emerging mobile node technologies such as long term evolution (LTE) and 2G/3G dual mode mobile nodes. The interworking function also supports a number of handoffs and handover situations. For example, in the same micro and macro radio access network (RAN) transitions from and to femto cell/macro GSM, femto cell/macro W-CDMA, femto cell/macro CDMA 2000, and femto cell/femto cell. Another example of the mobility provided by a interworking function is a transition to/from a CDMA femto cell and WiMAX macro or a W-CDMA femto cell and GSM macro. The interworking function provides service coverage and consistency in voice and packet data, for example, in a transition to/from existing macrocellular services and femto cell RAN. The interworking function can also provide local routing of data, in some embodiments, to avoid any delays that might be caused by backhaul links.

The interworking function can provide timing and frequency synchronization in the femto cell radio access network (RAN) and the core network. New femto cell specific services are provided by the interworking function. These services can include friends and family usage, sharing femto zone with friends and family, providing closed user group in a femtozone, local data/media access within a single femtozone, access to femtozone local data/media from a macro RAN, and providing data/media access between femtozones of single/multiple operators. The interworking function, in some embodiments, by virtue of its setup can reduce the complexity of the femto cell with which the interworking function communicates. This allows the interworking function to provide a femto cell that works with automatic discovery of the interworking function and automatic or minimal configuration of the femto access point. The interworking function can also perform statistics gathering, optimizations, and software upgrades.

The interworking function can also recognize the femto cell as a distinct network entity for the purposes of charging or assigning a different rate structure and works with pre-paid tariffs, post paid tariffs, and provides ITC for charging purposes. Various quality of service (QoS) features are provided by the interworking function. The interworking function can provide performance targets and measurements of the service provided as well as signaling and bearer separation and assurance. QoS relating to link layer mechanisms and mapped to IP layer can be provided. Also QoE or quality of experience can be provided over an unmanaged FBI (feedback information) mechanism. Security features such as signaling and bearer encryption are provided by the interworking function. Access authorization and mutual authentication between the network and the femto cell can be provided. The interworking function can allow service authorization for users including friends and family access control lists, denial of service prevention, and location management of a femto cell. The location management can be tied to a macro cell, a radio access identifier (RAI), a location access identifier (LAI), or a cell global identification (CGI).

The interworking function allows session management in a femtozone. This can be provided by policies that dictate, for example, whether to drop calls or allow best effort. The policies can be based on the time-of-day, day-of-week, or other periodic points for access. There can be a local breakout of voice, an internet offload, and differentiation of policy application depending on the type of traffic. In some embodiments the placement of nodes in the operator's public land mobile network (PLMN) can be with aggregation and IP-peering and/or co-location of various nodes. The interworking function also provides support for enterprise applications. This can include allowing multiple femto cell operators, each with subscribers in a given location and each operator using a separate path through a broadband connection to their services domain. The femto cell can also be deployed in a number of coverage types with the interworking function. For example, in indoor settings at residences and/or businesses in single and multi-tenant deployments as well as in industrial settings. In outdoor settings, the coverage types can be private or public, for example. Collapsed radio arbitration and connection management selection can be provided for collapsed femto and WiFi cells in some embodiments. In customer premise equipment (CPE), contention policies between femto and WiFi for the broadband link can be provided. In certain embodiments, discrimination and optimization for QoS can be provided in mobile operator peering to broadband backhaul service.

The interworking function can be configured to meet country specific regulations/standards such as lawful intercept, health (e.g., ERP of femto cells), interference at national borders, emergency service with location verification. In some embodiments, the interworking function uses existing signaling and functions, and extends them to a femto cell to provide backwards compatibility and broad support for devices, for example. The interworking function supports a wide range of multimedia and data services and can be agnostic to radio technologies in providing services. For example, code division multiple access (CDMA), CDMA2000, evolution data only (EVDO), global system for mobile communications (GSM), universal mobile telecommunications system (UMTS), long term evolution (LTE), WiMAX, wireless local area network (WLAN), iBurst, HIPERMAN, and WiBro can be supported by the interworking function. The UMTS supported can include E-UTRAN (evolved UMTS terrestrial radio access network), HSDPA (high-speed downlink packet access), HSUPA (high-speed uplink packet access), Evolved HSPA, and UMTS-TDD (UMTS time division duplexing). The interworking function can also be agnostic to the core network (CN) and can support 2G network switching subsystem (NSS), UMTS CN, CDMA CN, and common IMS CN for example. The interworking function also provides interworking between different technologies and core networks. This allows operators to minimize core network changes and can minimize the complexity of femto cells or femto access points deployed.

A femto cell or femto access point is a home BTS, nodeB or an e-nodeB, in some embodiments. Combined with a gateway supporting femto functionality, it acts as a BSS/RNC for a micro cellular environment. For CDMA2000, the combination acts as a PCF. The gateway also provides a proxy functionality that when acting like a RNC, for example, hides the femto cell from the core network and handles the processing to remove complexity from the core network having to communicate with many femto cells. Where applicable the gateway also provides seamless mobility between macro and femto cellular network. A femto cell connects to the gateway over a Fixed Broadband transport using a security association with the gateway. The security association between the femto cell and gateway is based on IPSec. IKEv2 is used as an IPSec protocol. In some embodiments, all the user plane and management plane traffic between the femto cell and the gateway is encrypted and integrity protected. The gateway creates a security association with the femto cell to provide a secure transport of signaling, bearer and management plane traffic. The gateway also provides a radio access network (RAN) aggregation function by including a signaling concentrator function. The signaling concentrator abstracts all the femto cells as a single radio network controller (RNC) to the public land mobile network core network (PLMN CN). The Interworking function may implement a policy and charging enforcement function (PCEF) to provide policy and charging control of subscriber service data flows. The gateway also provides authorized QoS to the flows. The gateway gets the policy and charging control (PCC) rules from a policy and charging rules function (PCRF).

IMS Capability

In some embodiments, the interworking function can be IP Multimedia Subsystem (IMS) capable to provide IMS service, packet switched service, and circuit switched (CS) service to mobile nodes such as user equipment (UE). As IMS service is packet switched, and as some femto deployments are circuit switched, the interworking function plays a significant role in allowing a UE to use both CS and PS services, for instance, interworking between non access stratum (NAS) and session initiation protocol (SIP) protocols. FIG. 1 illustrates an IMS capable interworking function in a network deployment. FIG. 1 includes a interworking function 110, a gateway 112, a mobile switching center (MSC) 114, an IP Multimedia Subsystem (IMS) 116, a home nodeB (HNB) 118, and a 3G macro cell 120. The interworking function 110 can provide HNB 118 service concurrently with a legacy IMS core. The interworking function 110 can interface with HNB 118 using a Iuh protocol and can interwork NAS to SIP signaling using the H2 reference point that builds on the I2 interface. A service domain selection function (S-DSF) can be implemented in the interworking function 110 that selects either the IMS or CS domain for originating service requests from user equipment. The interworking function 110 can also register a CS mobile node in the IMS 116 and be responsible for user plane interworking when IMS is selecting as a serving domain. The interworking gateway 110 can control interworking of user plane bearers, such as Iu-UP to Mb, by using a media gateway control protocol. As is described herein, the interworking function may appear either at the gateway or in the Home NodeB.

The interworking function may support the following scenarios in some embodiments. A UE using CS procedures for voice may originate a voice session through a HNB and the IMS core network, and may also terminate a voice session through the HNB and the IMS core network. A UE using PS procedures for voice may also allow origination and termination of a voice session through a HNB and/or an IMS core network. A UE may be able to perform idle mode mobility between a HNB and a CS or PS macro network. Service continuity may be maintained as a UE travels from a HNB to a CS macro network, for a UE that uses CS procedures for voice, or to a PS macro network, for a UE that uses PS procedures for voice. Additionally, IMS supplementary services may be executed for a UE which uses CS procedures, in some embodiments. CS services executed which do not have an equivalent in IMS may be provided by the CS domain. Emergency calls, which may be enabled by both the CS domain and the IMS domain, may be originated by the UE and routed through either the CS or IMS domain, depending on operator policy. The user may also perform configuration of supplementary services through the HNB from the UE using CS or PS procedures. In some embodiments, the interworking function may operate in a manner transparent to the UE, such that the UE may not know whether a call is operating over IMS.

Architecture

Figure 2:
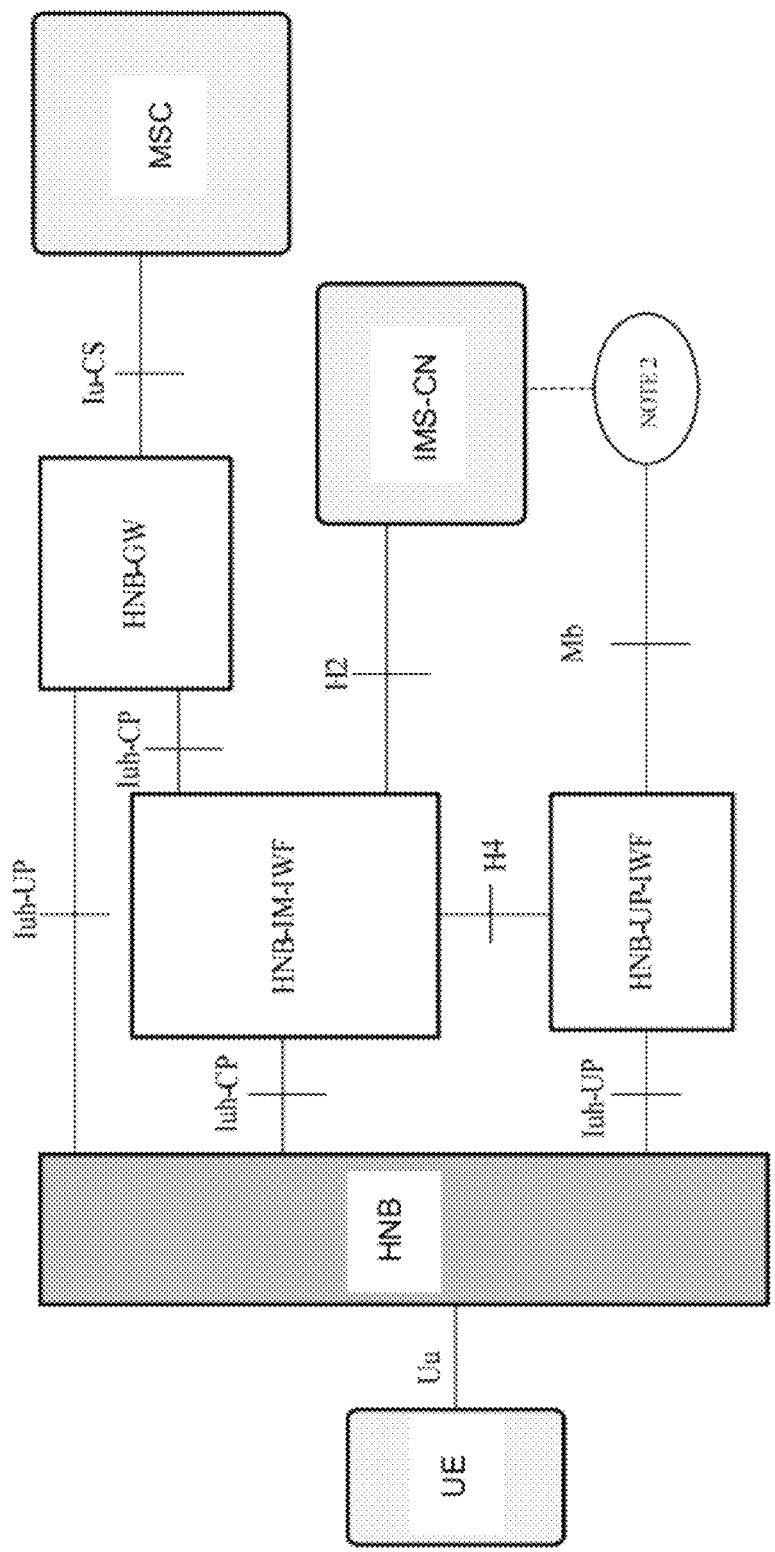
FIG. 2 is an architectural diagram relating the Home NodeB and various interworking functions.

In some embodiments, the IMS capable home nodeB system provides IMS based services to CS UEs and IMS UEs. FIG. 2 shows reference architecture for one possible embodiment of an IMS capable HNB system. The UE 200 is connected to a HNB 202, which is connected to a home nodeB gateway (HNB-GW) 204, a home nodeB IP multimedia interworking function (HNB-IM-IWF) 206, and a home nodeB user plane interworking function (HNB-UP-IWF) 208. In some embodiments these functions may be implemented on the same or different hardware devices.

Generally, in some embodiments, there are two types of traffic, user plane traffic and control plane traffic. Both HNB-IM-IWF 206 and HNB-UP-IWF 208 are interworking functions in the network domain; the distinction in practice is apparent from the type of traffic handled by the interworking function. User plane traffic is sent and received using the Iuh-UP protocol, and control plane traffic is sent and received using the Iuh-CP protocol. User plane traffic is terminated on the HNB-UP-IWF 208 when IMS is used as the serving domain and on HNB-GW 204 when used for circuit-switched (CS) domain services, e.g. a CS voice call. Control plane traffic is used for call setup and management, as well as mobile unit mobility between macro and femto cells. Iuh Control Plane is terminated on the HNB-IM-IWF 206 for serving domain selection in both CS or IMS domains. The IMS bearers may be connected via the Mb 214 to various network entities, such as a UE (e.g. via a GTP Tunnel to a GGSN) or a MRFP, etc.

The HNB-IM-IWF 206 is a logical function that terminates the NAS control plane from the UE. It incorporates one or more of the following: a serving domain selection function (S-DSF), a NAS/SIP interworking function, and a HNB-UP-IWF controller. The S-DSF decides if a chosen service domain is IMS or CS for a particular type of service. If CS domain is chosen, the service request is routed to the CS domain on the H3 interface to a MSC server that is R-99 or later. The NAS/SIP IWF interworks NAS signaling to SIP if the S-DSF chooses IMS as a serving domain. Finally, the HNB-UP-IWF controller controls setup and teardown on UP bearers over Iuh interface and IMS bearers towards IMS. This function is used when IMS is chosen as the serving domain.

The HNB-IM-IWF 206 interfaces to HNB over the Iuh reference point. The HNB-IM-IWF interworks NAS to SIP signaling using the H2 reference point 216 that builds on the I2 interface. The HNB-IM-IWF has a service domain selection function that selects either the IMS or the CS domain for originating service requests from a UE. Preference is given to anchor the session in IMS whenever possible. Service Domain selection decisions are controlled by operator policy. The HNB-IM-IWF is also responsible for registering the CS UE in IMS, and also controls interworking of user plane bearers of Iu-UP to Mb 214 by using media gateway control protocol over H4 reference point.

The HNB-UP-IWF 208 interworks Iu-h user plane to Mb 214. HNB-UP-IWF receives bearer set up, interworking and teardown commands from HNB-IM-IWF over the H4 reference point 218. The HNB-UP-IWF is responsible for User Plane interworking when IMS is selected as a serving domain by the HNB-IM-IWF. Serving Domain selection influences the termination of Iuh-UP. When the serving domain is IMS the Iuh-UP terminates at the HNB-UP-IWF. If the serving domain is CS then the Iuh-UP terminates at HNB-GW. Iuh-UP termination is a result of the completion of standard call setup procedures.

The H2 216 and H4 218 reference points are described here. The H2 reference point 216 is between the HNB-IM-IWF and the IMS CN, and builds upon the I2 reference point. The H4 reference point 218 is between the HNB-IM-IWF and the HNB-UP-IWF. It is used for media control to interwork Iuh user plane with IMS bearers. The H4 reference point 218 is similar to Mc reference point, i.e. it is used for H.248 based media gateway control.

Protocol Stacks

Figure 3:
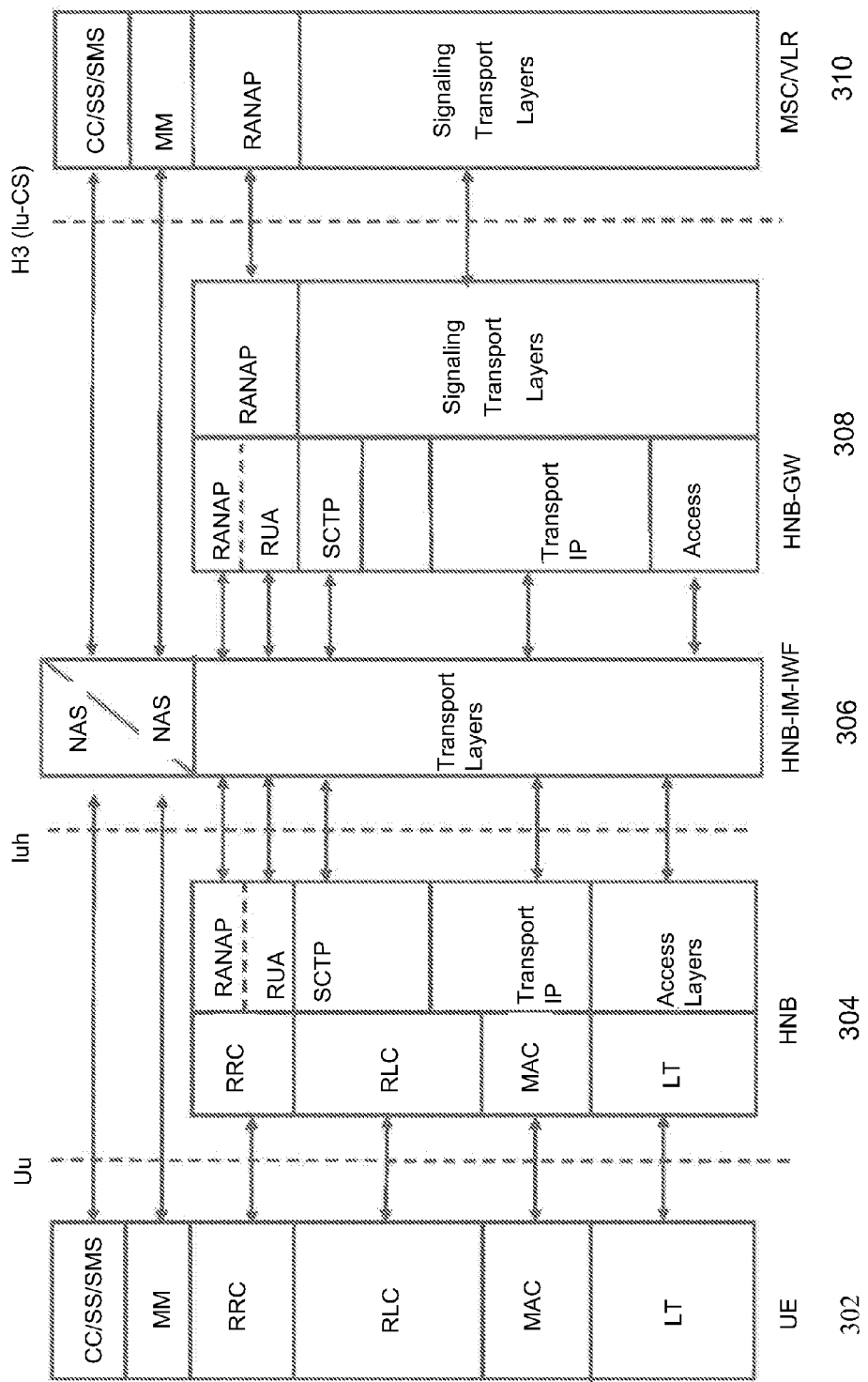
FIG. 3 is a protocol stack for the control plane serving domain in a circuit switched network.
Figure 4:
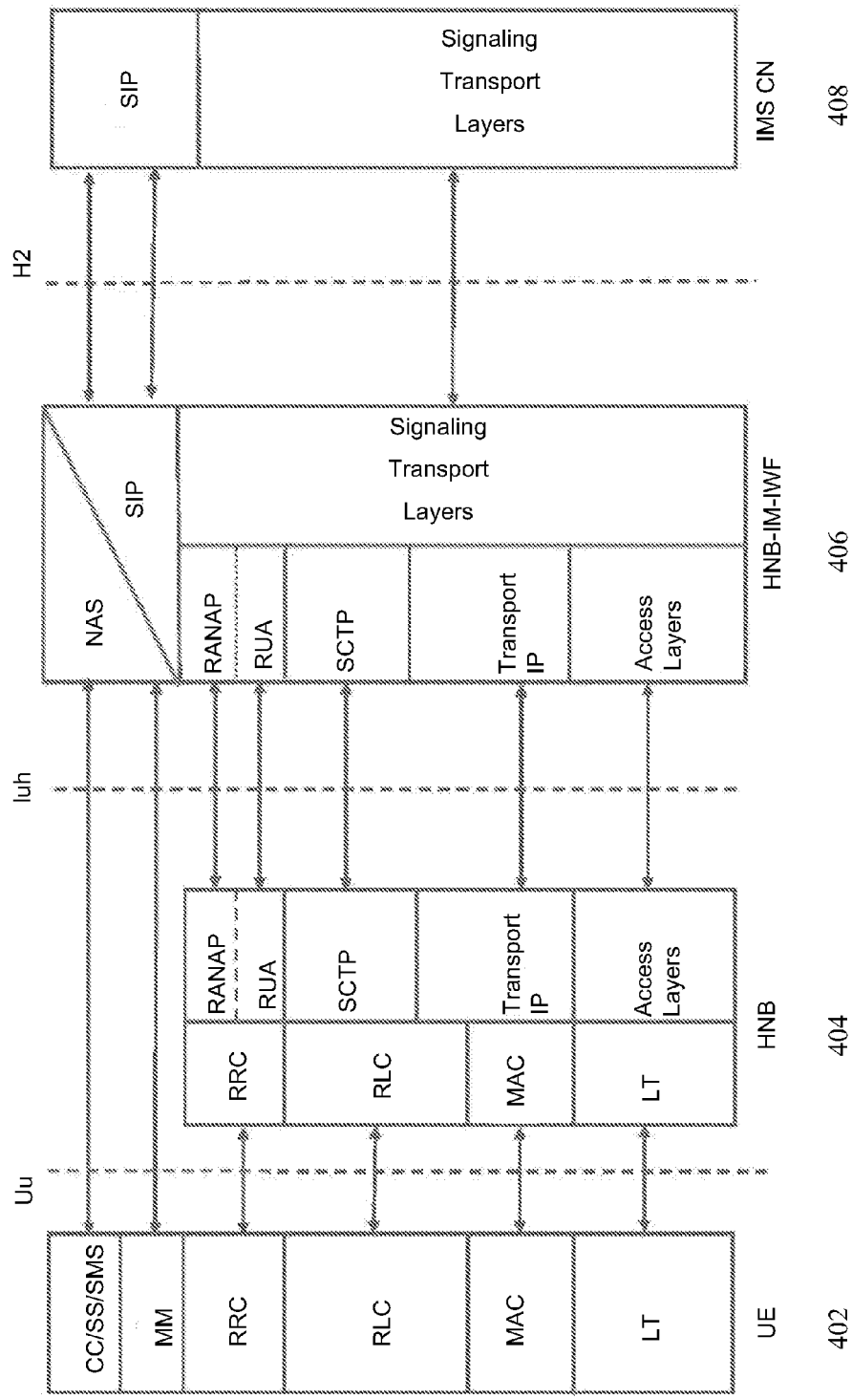
FIG. 4 is a protocol stack for the control plane serving domain in an IMS network.

FIG. 3 shows the protocol stack 300 when the CS domain is selected as a serving domain for a service request. FIG. 4 shows the protocol stack 400 when the IMS CN is selected as a serving domain for a service request. The diagrams show a legacy UE and a legacy HNB communicating over the Iuh protocol to a HNB-IM-IWF. In FIG. 3, the interworking function (HNB-IM-IWF) 306 does not interwork the received NAS messages to another protocol, but in FIG. 4, the interworking function 406 interworks NAS to SIP, and then sends the SIP messages on to the IMS CN 408. As IMS is designed to be access-independent, we note that legacy protocols such as radio access network application part (RANAP), which are specific to radio access networks, are no longer present in the interworked message or in the IMS CN.

Legacy UE Messaging Protocols

There are several different messaging protocols that may be implemented in accordance with different embodiments of the invention. In particular, the interworking function should behave differently depending on whether or not a user equipment (UE), gateway or service delivery node is designed to understand IMS protocols such as ICS. If the equipment is not designed to understand IMS, it is designated as legacy equipment. The following procedures are designed to work with legacy UEs that do not understand IMS protocols. In the case that a UE is compatible with 3GPP Release 8, a 4G all-IP LTE network standard, it necessarily understands IMS protocols and will be able to request and receive services according to standard IMS protocols.

Attach Procedure

Figure 5:
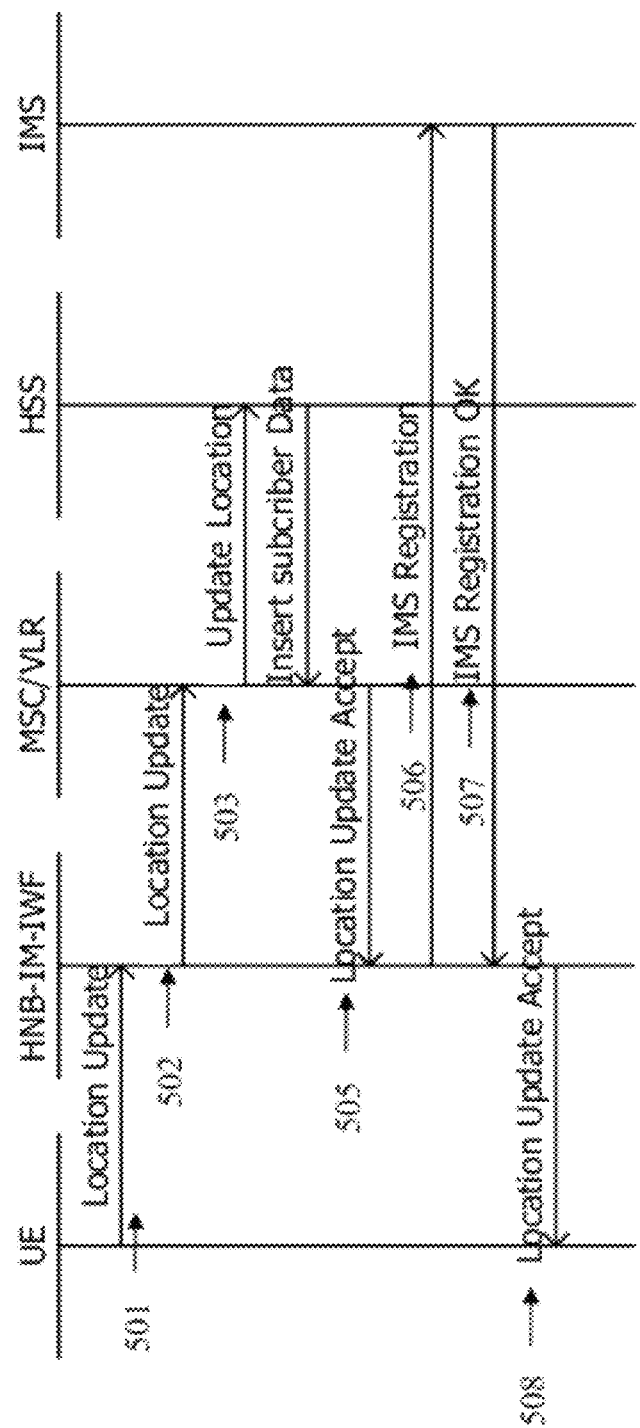
FIG. 5 is a diagram of the UE attach procedure for a UE joining a HNB.

FIG. 5 illustrates the attach procedure for a UE joining a HNB and acquiring IMS services in accordance with certain embodiments. In certain embodiments, the MSC is IMS-capable and compatible with 3GPP Release 8, a 4G all-IP LTE network standard. In 501, the UE initiates the attach procedure by sending a Location Update NAS message 000. In 502, the interworking function derives a VLR number based on the allocated LAI and on an IMSI hash function. The MSC/VLR selected is the same that serves the LA in the macro network where the HNB is located. Subsequently, in 503-505, an Update Location procedure is performed by the MSC server towards the HSS, and UE authentication is performed. In 506, the interworking function registers the UE towards IMS. Subsequently, once the IMS registration is accepted 507, a Location Accept message is sent to the UE 508. At this point the UE is registered in the CS domain as well as the IMS CN domain.

Mobility Procedures

In some embodiments, when a new UE enters into an IMS capable HNB, the interworking function may register the UE to IMS. This allows the network to provide subsequent UE-originated and -terminated services over IMS using CS-specific NAS signaling. In other embodiments, a UE enters into a non-IMS capable HNB or a non-IMS capable macro node. The following paragraphs illustrate setup of mobility from a femto node to a macro node and from a macro node to a femto node, both in idle mode and in connected mode, and for IMS capable and non-IMS capable macro nodes.

Figure 6:
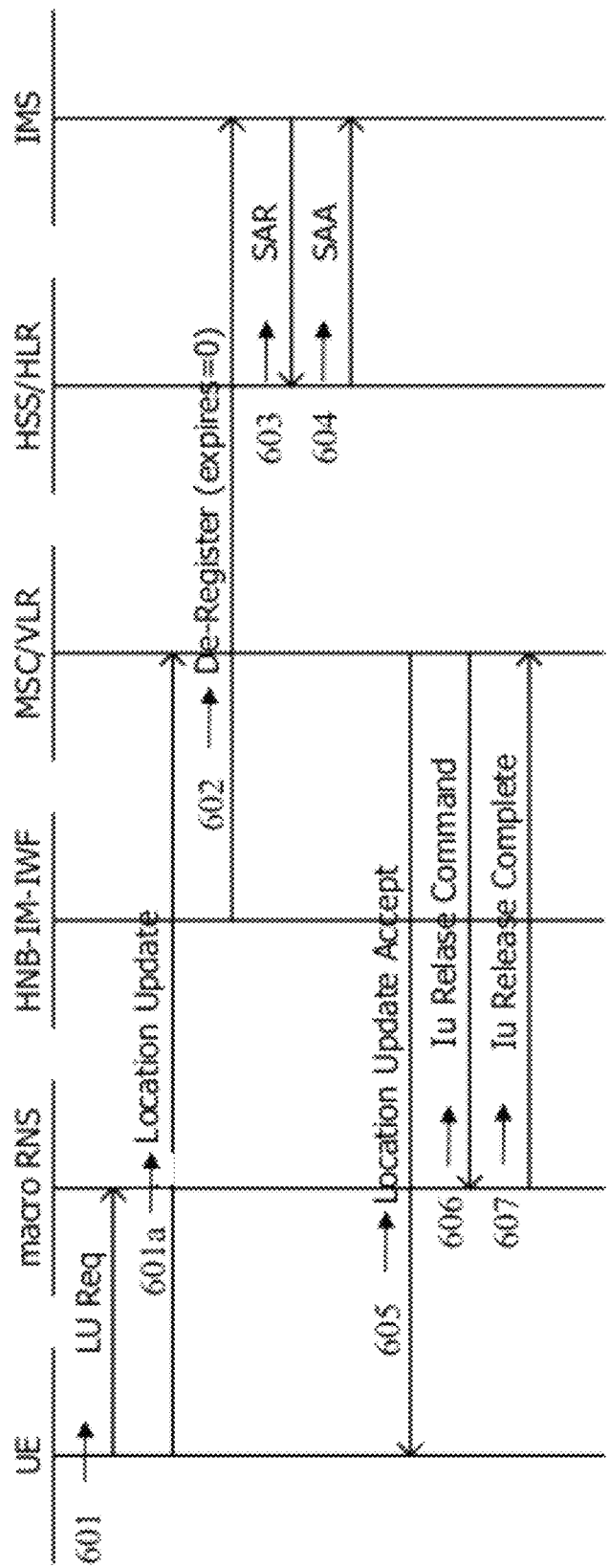
FIG. 6 is a diagram of the idle mode mobility procedure for the HNB to macro RNS scenario for a legacy UE and a non-ICS capable macro MSC.

FIG. 6 illustrates the idle mode mobility procedure for the HNB to macro RNS scenario for a legacy UE and a macro MSC that is not ICS capable, in accordance with certain embodiments. As a prerequisite the UE is in the MM Idle state, having previously attached with the HNB system as shown in FIG. 5. In 601, the UE moves out of the HNB cell and initiates RRC connection on SIB monitoring to send a Lu request to the RNC that results in Iu connection setup. Subsequently the UE sends a NAS Location Area Update message to the non-ICS capable MSC, which notes the change in the RNC-id and LAC. In 602, the interworking function subsequently de-registers the UE in IMS when the T3211 or T3212 timer expires or a call termination paging request fails. When this occurs, the IMS (S-CSCF) sends a SAR to HSS to inform that the UE is no longer registered in IMS, and the MSC sends a Location Update Accept to the UE; finally, Iu connections are released.

Figure 7:
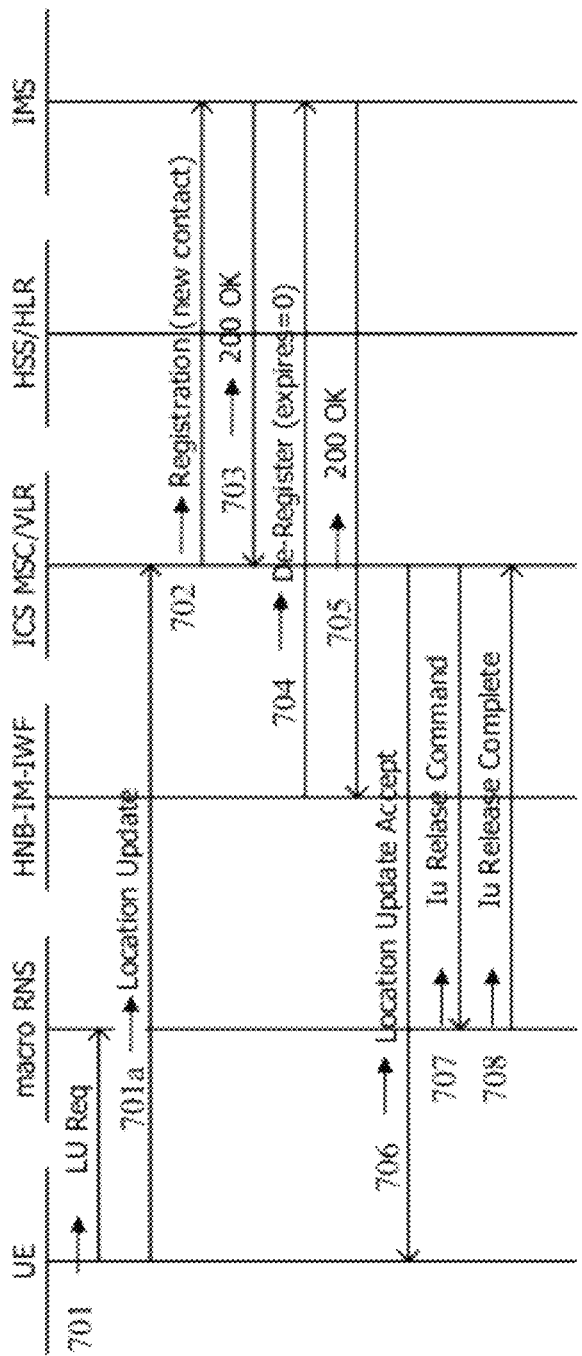
FIG. 7 is a diagram of the idle mode mobility procedure for the HNB to macro RNS scenario for a legacy UE and a ICS capable macro MSC.

FIG. 7 illustrates the idle mode mobility procedure for the HNB to macro RNS scenario for a legacy UE and a macro MSC that is ICS capable, in accordance with certain embodiments. In certain embodiments, the MSC is IMS-capable and compatible with 3GPP Release 8, a 4G all-IP LTE network standard. As a prerequisite the UE is in a MM Idle state, having previously attached to the HNB system as shown in FIG. 5. In 701, the UE moves out of the HNB cell, and on SIB monitoring it initiates a RRC connection to send a Lu Req to the RNC, resulting in a Iu connection setup. Subsequently the UE sends a NAS Location Area Update message to the ICS MSC. The ICS MSC notes the change in the RNC-id and LAC. In 702-703, the ICS-capable MSC then sends an IMS registration for the new contact for the UE. This procedure is described in detail in TS 23.292. In 704-705, the interworking function then de-registers the UE in IMS when the T3211 or T3212 timer expires or a call termination paging request fails. In 706, MSC sends a Location Update Accept to the UE, and Iu connections are released 707.

Figure 8:
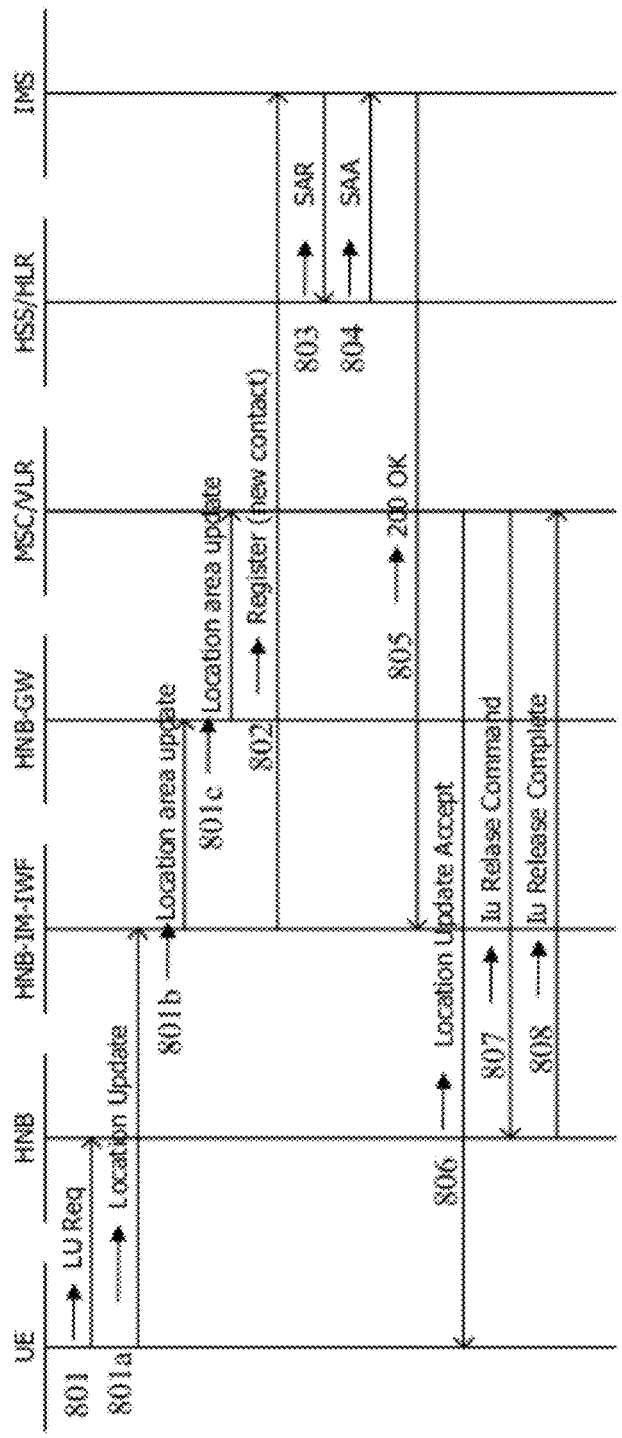
FIG. 8 is a diagram of the idle mode mobility procedure for the macro RNS to HNB scenario for a legacy UE and a non-ICS capable macro MSC.

FIG. 8 illustrates the idle mode mobility procedure for the macro RNS to HNB scenario for a legacy UE and a macro MSC that is not ICS capable, in accordance with certain embodiments. As a prerequisite the UE is in a MM Idle state, having previously attached in the macro RNS. At 801, the UE moves into the HNB cell. On SIB monitoring, it initiates a RRC connection to send a Lu Req to the HNB, resulting in a Iu connection setup. Subsequently the UE sends a NAS Location Area Update message to the interworking function, and the interworking function sends the LAU to the MSC via the HNB-GW. The MSC notes the change in the RNC-id and LAC. Next, at 802, the interworking function registers the UE in IMS with the new contact information, and the IMS (S-CSCF) sends a SAR to HSS to inform it that the UE is now registered in IMS, 803-804. IMS sends a 200 OK response for a successful UE registration 805. Finally, the MSC sends a Location Update Accept to the UE 806, and Iu connections are released 807-808.

Figure 9:
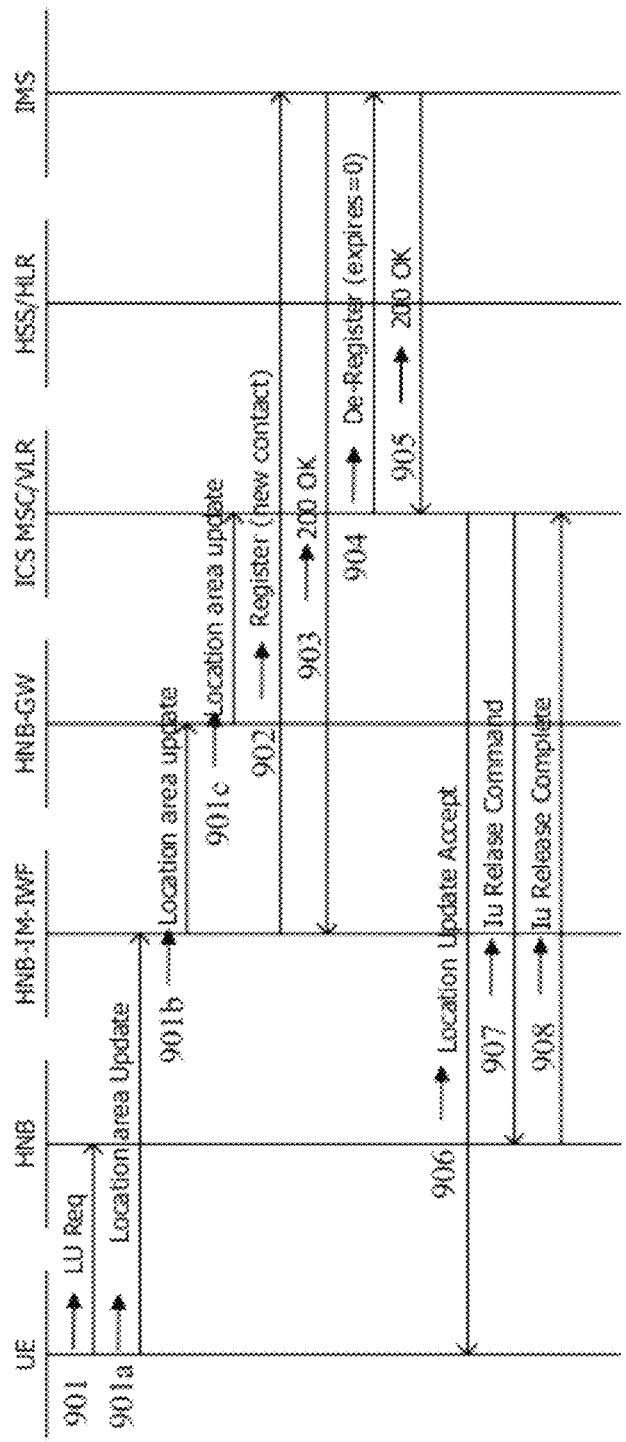
FIG. 9 is a diagram of the idle mode mobility procedure for the macro RNS to HNB scenario for a legacy UE and a ICS capable macro MSC.

FIG. 9 illustrates the idle mode mobility procedure for the macro RNS to HNB scenario for a legacy UE and a MSC that is ICS capable, in accordance with certain embodiments. In certain embodiments, the MSC is IMS-capable and compatible with 3GPP Release 8, a 4G all-IP LTE network standard. As a pre-requisite the UE is in MM Idle state having previously attached in the macro RNS. In 901, the UE moves into the HNB cell, and on SIB monitoring it initiates a RRC connection to send a Lu Req to the HNB that results in a Iu connection setup. Subsequently, the UE sends a NAS Location Area Update message to the interworking function. The interworking function sends the LAU to the MSC via HNB-GW, and the MSC notes the change in the RNC-id and LAC. In 902-903, the interworking function registers the UE towards IMS with the new contact information. In 904-905, ICS MSC de-registers the UE from IMS. In 906, MSC sends a Location Update Accept to the UE, and subsequently in 907-908, Iu connections are released.

Figure 10:
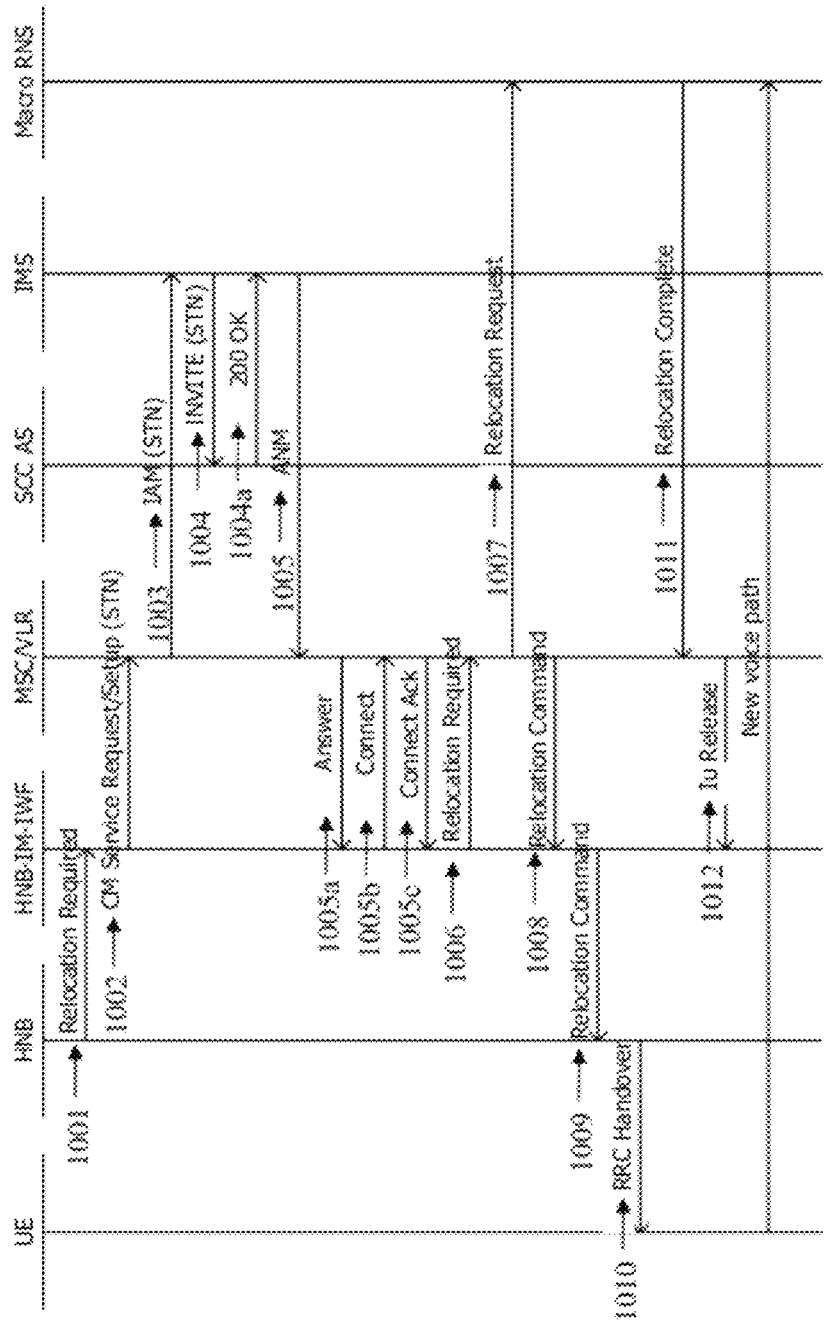
FIG. 10 is a diagram of the connected mode mobility procedure for the HNB to macro RNS scenario for a legacy UE and a macro MSC that is not ICS capable.

FIG. 10 illustrates the connected mode mobility procedure for the HNB to macro RNS scenario for a legacy UE and a macro MSC that is not ICS capable, in accordance with certain embodiments. As a prerequisite the UE has a session anchored in IMS. Based on radio measurement reports the HNB sends a Relocation required request 1001 to the interworking function to trigger serving radio network subsystem (SRNS) relocation to a macro RNS. Next, the interworking function initiates a CS call on behalf of the UE towards the MSC, by sending a CM Service request/Setup 1002. The called party number is the session transfer number (STN) that was allocated by the IMS/SCC AS during session setup. A STN is an E.164 number that maps to a PSI DN. The IMS has configured iFC to route this PSI DN to the SCC AS. Subsequently, the MSC sends the IAM 1003 out with the STN as the called party number, causing the call to be routed to the IMS CN. In 1004-1004a, the IMS/S-SCSF routes the invite message to the S-CSCF based on an iFC trigger. In 1005-1005c, the SCC AS correlates the call with the original UE session, updates the remote leg and sends the response back. Next, the interworking function sends the relocation required request 1006 to the MSC. The MSC then sends the relocation request 1007 to the macro RNS, which sends a relocation command message 1008 to the interworking function. The interworking function forwards the relocation command message to the HNB 1009. At 1010, the HNB sends a message to the UE to initiate RRC handover for the UE. Finally, the Macro RNS reports relocation complete to the MSC 1011, and the MSC releases the Iu connection with the interworking function 1012, at which point the call has successfully been migrated to the macro RNS.

Figure 11:
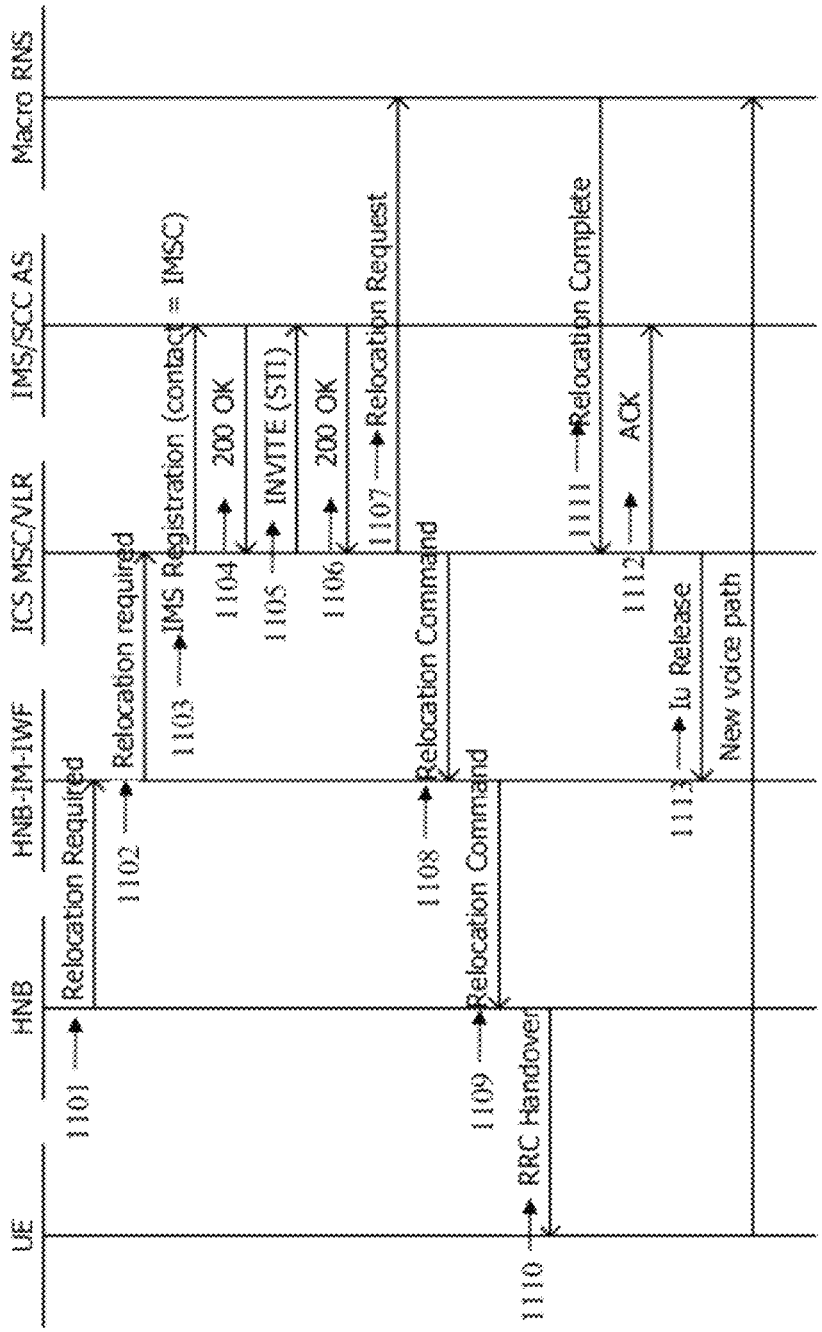
FIG. 11 is a diagram of the connected mode mobility procedure for the HNB to macro RNS scenario for a legacy UE and an ICS capable MSC.

FIG. 11 illustrates the connected mode mobility procedure for the HNB to macro RNS scenario for a legacy UE and an ICS capable MSC, in accordance with certain embodiments. As a prerequisite the UE has a session anchored in IMS. Based on radio measurement reports the HNB sends a Relocation required request 1101 to the interworking function to trigger SRNS relocation to a macro RNS. The interworking function sends the relocation required request 1102 to the ICS MSC. In 1103-1104, the ICS MSC registers the UE in IMS with the new contact address. Subsequently, the ICS MSC sends the invite message with the STI 1105 towards the IMS CN. This STI is used to correlate the IMS sessions that need to be replaced at the SCC AS. iFC triggers in the S-CSCF help route this invite to the SCC AS. The IMS returns response 1106. Next, the MSC sends the relocation request 1107 to the macro RNS, and the relocation command message 1108 to the interworking function. The interworking function next forwards the relocation command message to the HNB 1109, and then the HNB initiates RRC handover for the UE 1110. At this point the macro RNS reports Relocation Complete to the MSC 1111, and ICS MSC sends the ACK back to the IMS 1112, causing the SCC AS to update the remote leg with the new media flow update. In 1113, MSC releases the Iu connection with the interworking function. At this point, the call has successfully migrated to the macro RNS.

Call Origination

Figure 12:
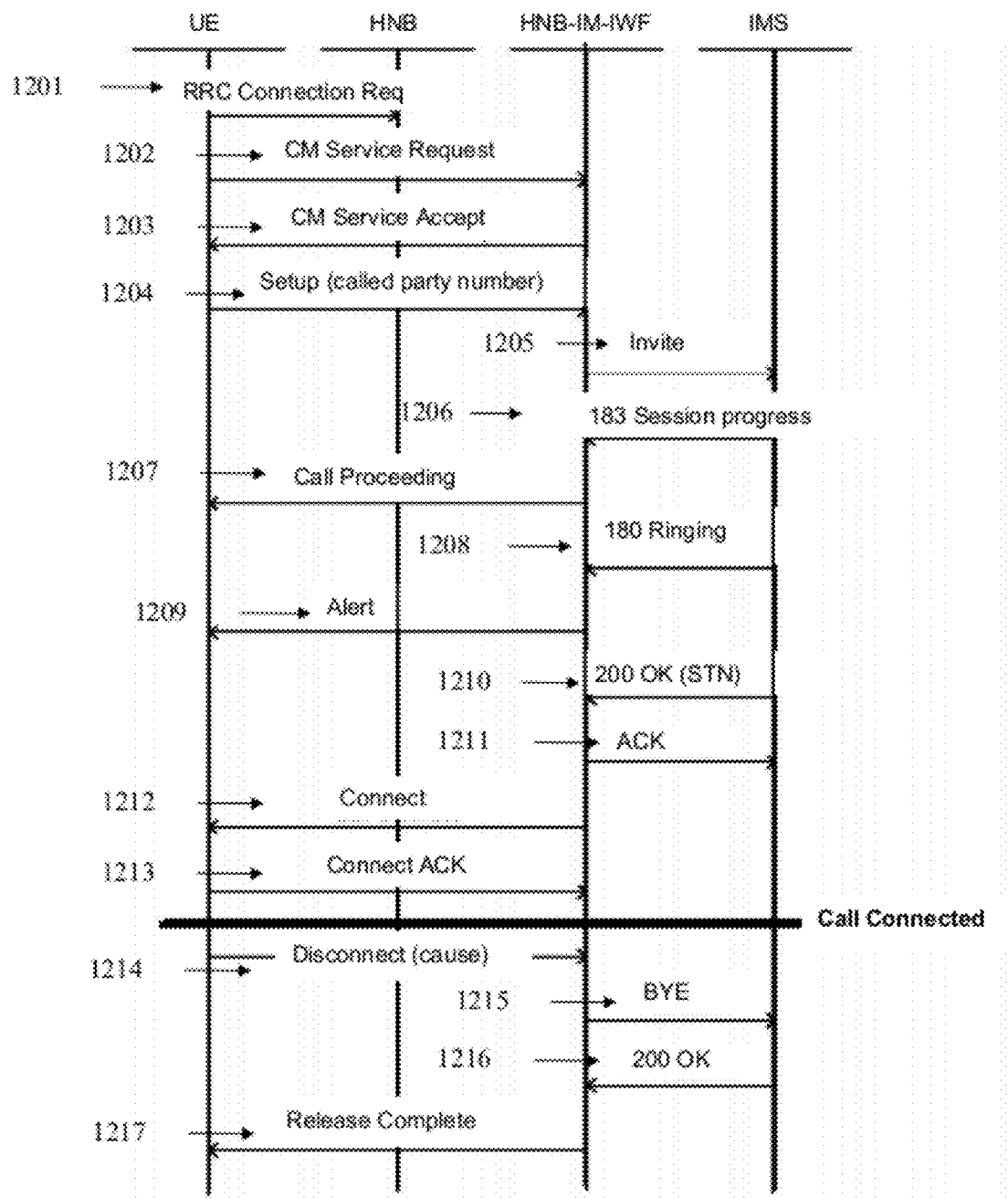
FIG. 12 is a diagram of the connection management procedure for a mobile originated call within an IMS core network for the scenario of a legacy UE that is camped on a HNB.

FIG. 12 illustrates the connection management procedure for a mobile originated call within an IMS core network for the scenario of a legacy UE that is camped on a HNB, in accordance with certain embodiments. As a prerequisite the UE is in a MM Idle state, having previously attached with the HNB system and registered with the IMS.

At 1201, the UE initiates a RRC connection request to transition from Idle mode to Connected mode to get ready to make a CS call. At 1202-1203, the UE sends a connection management service request and the interworking function responds back with a connection management service acceptance. Subsequently, at 1204, the UE sends a call connection setup message. At 1205, the interworking function interworks the call connection setup message into a SIP invite message. The interworking function sends the invite message to the IMS. At 1206-1207, the IMS responds with a 183 session progress message, which is interworked by the interworking function to a call proceeding message, and then sent to the UE. At 1208-1209, if the called party is ringing, the IMS sends a 180 ringing message to the interworking function. The interworking function interworks it to an alert message and sends it to the UE. At 1210-1211, if the called party answers, the IMS responds with a 200 OK message which also contains a STN that is allocated by the IMS/SCC AS to be used if needed for any future session continuity with a legacy MSC, e.g. for connected mode mobility from a HNB cell to a macro RNS. This dynamically allocated STN from IMS/SCC AS is not needed if the MSC is ICS capable. At 1212-1213, the interworking function sends a Connect to the UE to inform that the call is established. To tear down the call/session, the UE sends a Disconnect to the interworking function, 1214. The interworking function interworks it to BYE towards IMS/SCC AS to tear down the session, 1215-1216. At 1217, the interworking function sends a Release Complete message to the UE.

Figure 13:
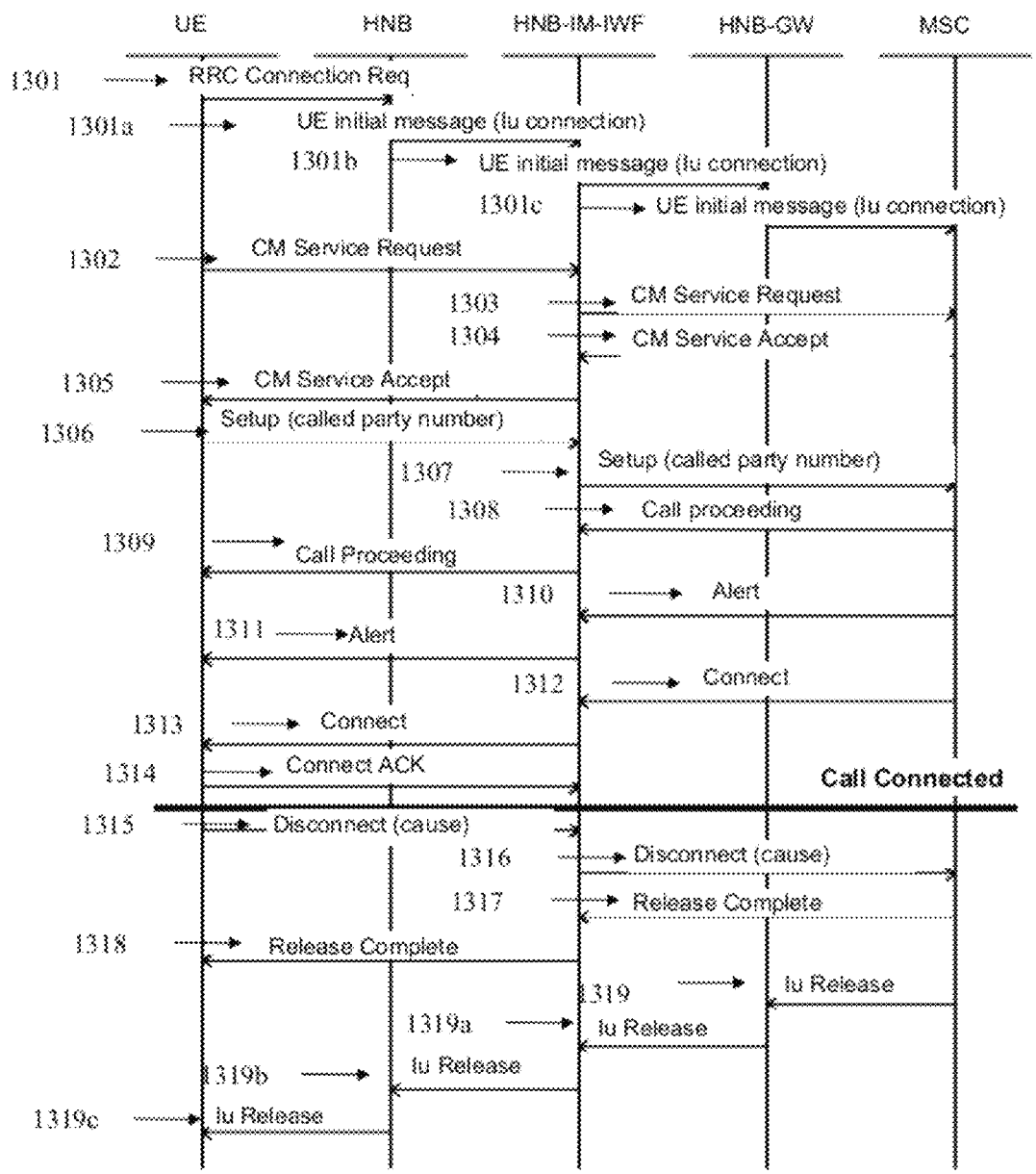
FIG. 13 is a diagram of the connection management procedure for a mobile originated call within the CS domain for the scenario of a legacy UE (pre Release 8) that is camped on a HNB.

FIG. 13 illustrates the connection management procedure for a mobile originated call within the CS domain for the scenario of a legacy UE (pre Release 8) that is camped on a HNB, in accordance with certain embodiments. As a prerequisite the UE is in a MM Idle state, having previously attached with the HNB system and registered in the CS domain. This applies when calls/services are not provided by an IMS core network.

At 1301, the UE initiates a RRC connection request to transition from Idle mode to Connected mode to get ready to make a CS call. An Iu connection is setup between the HNB, the interworking function, the HNB-GW and the MSC in steps 1302-1305. The UE sends a connection management service request to the interworking function 1302, which then sends it to the MSC 1303. The MSC responds back with a connection management service accept message 1305. At 1306-1307, the UE sends a call connection setup message, and the interworking function sends the setup message to the MSC. Thr MSC responds with a Call Proceeding message 1308, which is forwarded by the interworking function to the UE 1309. If the called party is ringing, the MSC sends Alert to the interworking function 1310, which sends it to the UE 1311. If the called party answers, IMS responds with a Connect to the interworking function 1312, and the interworking function sends the Connect to the UE to inform that the call is established 1313. The UE subsequently responds with a Connect ACK message 1314. To tear down the call/session, the UE sends a Disconnect to the interworking function 1315. The interworking function then sends the Disconnect to the MSC to tear down the call 1316. Once the call is torn down the MSC sends the Release complete to the interworking function 1317, which then forwards the Release Complete to the UE 1318. This causes the Iu connection is released as well as the RRC connection 1319, 1319*a-c*.

Call Termination

Figure 14:
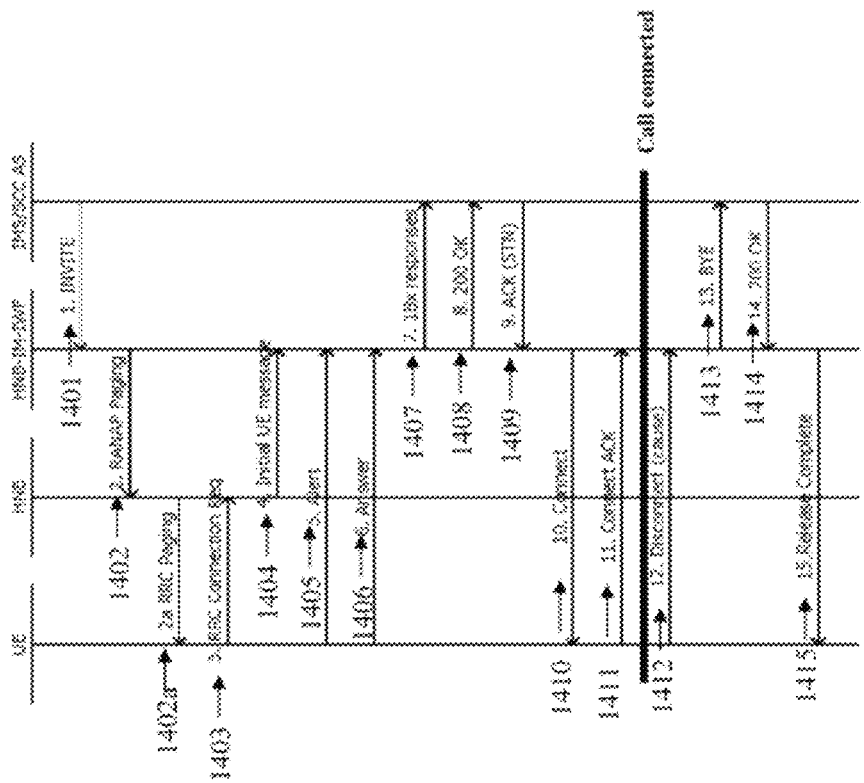
FIG. 14 is a diagram of the connection management procedure for a mobile terminated call within an IMS core network for the scenario of a legacy UE that is camped on a HNB.

FIG. 14 illustrates the connection management procedure for a mobile terminated call within an IMS core network for the scenario of a legacy UE that is camped on a HNB, in accordance with certain embodiments. As a prerequisite the UE is in a MM Idle state, having previously attached with the HNB system and registered with the IMS.

At 1401, IMS sends an invite message towards the interworking function to terminate an incoming IMS session for a CS UE. The interworking function sends a Paging request 1402 to the HNB that results in a RRC page 1402*b*. The UE responds to the Page by initiating a RRC Connection request to transition to Connected mode 1403. This causes the HNB to send an initial UE message to the interworking function 1404, which creates a Iu connection for the UE. The UE sends an Alert 1405 and an Answer 1406 to the interworking function, which interworks it to 18× responses 1407 and 200 OK responses 1408, and sends it IMS CN. The IMS sends an ACK back 1409. The ACK may include a STN that was allocated by the SCC AS for any future session continuity (e.g. connected mode mobility from the HNB to a macro RNS) if the MSC is not ICS capable. This dynamically allocated STN from IMS/SCC AS is not needed if the MSC is ICS capable. At 1410, the interworking function sends a Connect to the UE and the UE sends back a Connect Ack 1411, at which point the call is successfully established. To tear down the call/session, the UE sends a Disconnect 1412 to the interworking function. The interworking function interworks it to BYE 1413 towards IMS/SCC AS to tear down the session. Once it receives reply 1414, IM-IWF sends Release Complete to the UE 1415.

Figure 15:
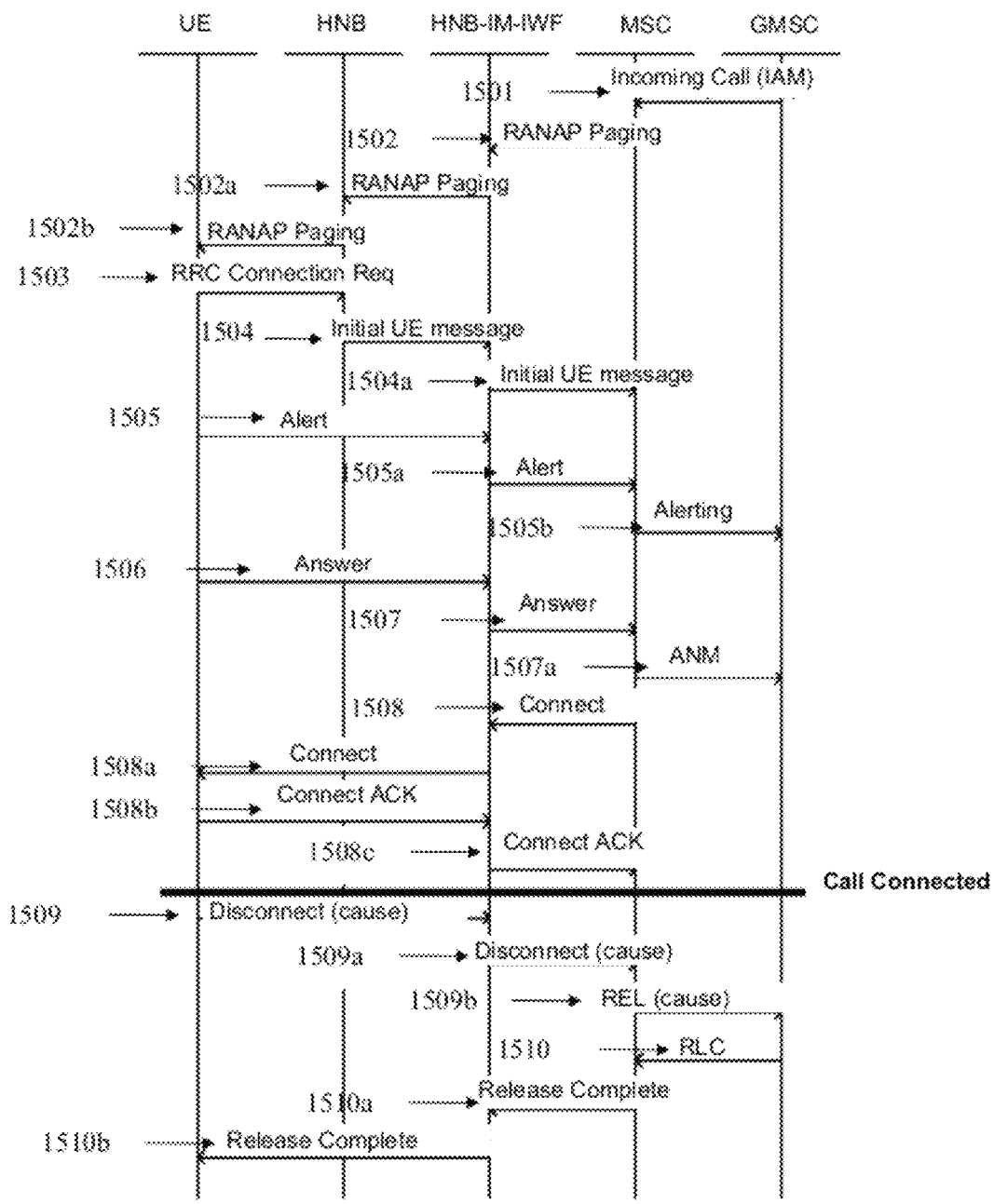
FIG. 15 is a diagram of the connection management procedure for a mobile terminated call within the CS domain for the scenario of a legacy UE (pre Release 8) that is camped on a HNB.

FIG. 15 illustrates the connection management procedure for a mobile terminated call within the CS domain for the scenario of a legacy UE (pre Release 8) that is camped on a HNB, in accordance with certain embodiments. As a prerequisite the UE is in a MM Idle state, having previously attached with the HNB system and registered in the CS domain. This applies when calls/services are not provided by an IMS core network.

At 1501, the MSC receives an call for the CS UE. The terminating call is for a service that is not available in IMS. At 1502-1502*b*, the MSC sends a Page for the UE via the HNB-GW and the interworking function. The UE responds to the Page by initiating a RRC Connection request 1503 to transition to Connected mode. This triggers a Initial UE message 1504 from the HNB to the interworking function, which passes the message to the MSC 1504*a* and creates a Iu connection for the UE. In 1505-1507*a*, the UE sends an Alert and an Answer to the interworking function, which sends it to the MSC. In 1508-1508*c*, the MSC sends a Connect to the interworking function, which sends a Connect to the UE; the UE subsequently sends back a Connect Ack, which is forwarded by the interworking function to the MSC. At this point the call is successfully established. To tear down the call/session, the UE sends a Disconnect to the interworking function 1509, which forwards it to the MSC 1509*a*, 1509*b*. The MSC receives a RLC message 1510 and sends a Release complete to the interworking function 1510*a*, which sends it to the UE 1510*b*.

Chassis

Figure 16:
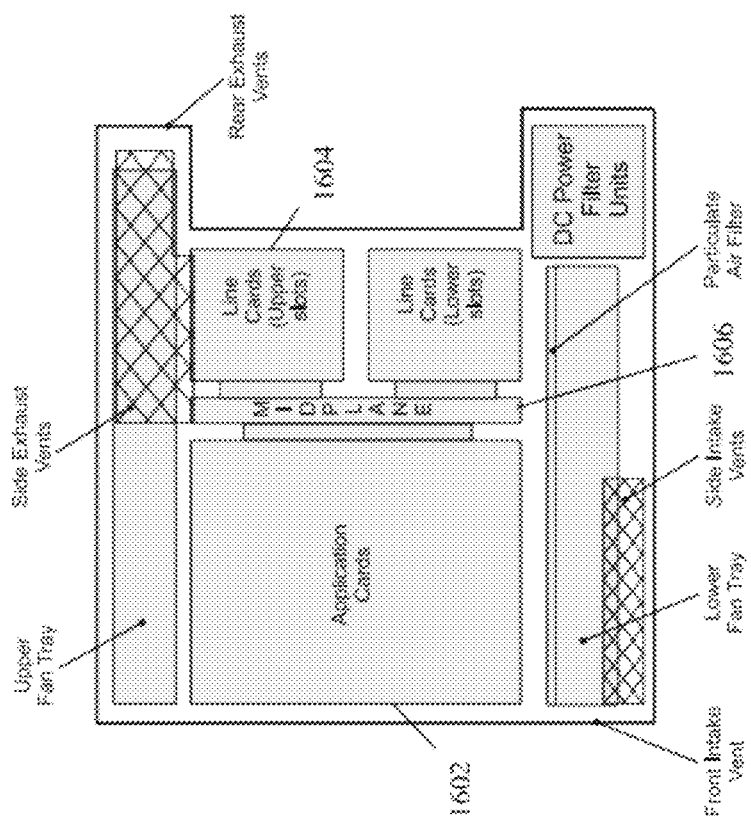
FIG. 16 is a diagram of a chassis with multiple and different integrated functionalities.

The interworking function described above can be implemented on a chassis with multiple and different integrated functionalities, as is illustrated in FIG. 16. In some embodiments, a mobility management entity (MME), a serving gateway (SGW), a PDN gateway (P-GW), an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an inter-rogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

The features of a chassis that implements a gateway, in accordance with some embodiments, are further described below. FIG. 16 illustrates positioning of cards in the chassis in accordance with some embodiments. The chassis includes slots for loading application cards 1602 and line cards 1604. A midplane 1606 can be used in the chassis to provide intra-chassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides multi-threaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A femto gateway comprising:
   an interface configured to establish a security association using encryption to provide a secure tunnel through a broadband network to at least one femtocell;
   an interface configured to establish circuit switched communications with a circuit switched network;
   an interface configured to establish communications with an IP Multimedia Subsystem (IMS) network;
   an interworking function that communicates with user equipment through the security association to provide connectivity to both IMS and circuit switched networks and interworks NAS signaling received from the user equipment over the security association into session initiation protocol (SIP) signaling to enable communication with the IMS network using SIP signaling; and
   a service domain selection function that is configured to determine if the interworking function provides connectivity to the IMS network or the circuit switched network;
      wherein the femto gateway is configured to couple to a plurality of femto cells and wherein the femto gateway is configured to provide a proxy functionality to hide the complexity of the plurality of femto cells.

2. The femto gateway of claim 1, wherein the interworking function registers a circuit switched user equipment in the IMS network.

3. The femto gateway of claim 1, wherein the interworking function controls interworking of user plane bearers by using a media gateway control protocol.

4. The femto gateway of claim 1, wherein the interworking function receives a setup message from the user equipment over the security association, interworks the setup message to send a corresponding SIP Invite message to the IMS network.

5. The femto gateway of claim 1, wherein the interworking function receives a service request message from the user equipment over the security association and the service domain selection function determines the call should be established with the circuit switched network so the interworking function sends a service request message to a mobile switching center (MSC) to setup a connection to the circuit switched network.

6. The femto gateway of claim 1, wherein the femto cell is a Home Node-B (HNB), the femto gateway is a Home Node-B Gateway (HNB-GW), and the interworking function is a HomeNodeB IP Multimedia Interworking Function (HNB-IM-IWF).

7. The femto gateway of claim 1, wherein the femto gateway is configured to handoff the user equipment from the femto cell to a macro radio access network.

8. The femto gateway of claim 1, wherein the femto gateway provide quality of service (QoS) to data communicated between the femto cell and the IMS network.

9. A method, comprising:
   establishing a security association using encryption to provide a secure tunnel through a broadband network to at least one femtocell;
   establishing circuit switched communications with a circuit switched network;
   establishing communications with an IP Multimedia Subsystem (IMS) network;
   communicating with user equipment through the security association to provide connectivity to both IMS and circuit switched networks;
   interworking NAS signaling received from the user equipment over the security association into session initiation protocol (SIP) signaling to enable communication with the IMS network using SIP signaling;
   receiving NAS signaling from a circuit switched user equipment and providing connectivity to a circuit switched network through an interworking function; and
   determining at a service domain selection function if the interworking function provides connectivity to the IMS network or the circuit switched network;
      further comprising communicating with a plurality of femto cells from a femto gateway and providing at the femto gateway a proxy functionality to hide the complexity of the plurality of femto cells.

10. The method of claim 9, further comprising registering a circuit switched user equipment in the IMS network.

11. The method of claim 9, further comprising controlling interworking of user plane bearers by using a media gateway control protocol.

12. The method of claim 9, further comprising:
   receiving a setup message from the user equipment over the security association; and
   interworking the setup message to send a corresponding SIP Invite message to the IMS network.

13. The method of claim 9, further comprising:
   receiving a service request message from the user equipment over the security association;
   determining a call should be established with the circuit switched network; and
   sending a service request message to a mobile switching center (MSC) to setup a connection to the circuit switched network.

14. The method of claim 9, wherein the femto cell is a Home Node-B (HNB), the femto gateway is a Home Node-B Gateway (HNB-GW), and the interworking function is a HomeNodeB IP Multimedia Interworking Function (HNB-IM-IWF).

15. The method of claim 9, further comprising handing off the user equipment from the femto cell to a macro radio access network.

16. The method of claim 9, further comprising providing quality of service (QoS) to data communicated between the femto cell and the IMS network.

17. A femto gateway comprising:

means for establishing a security association using encryption to provide a secure tunnel through a broadband network to at least one femto cell;

means for interworking NAS signaling received from the user equipment over the security association into session initiation protocol (SIP) signaling to enable communication with the IMS network using SIP signaling;

means for receiving NAS signaling from a circuit switched user equipment and providing connectivity to a circuit switched network through an interworking function; and means for determining at a service domain selection function if the interworking function provides connectivity to the IMS network or the circuit switched network:

wherein the femto gateway is configured to couple to a plurality of femto cells and the femto gateway is configured to provide a proxy functionality to hide the complexity of the plurality of femto cells.

\* \* \* \* \*